United States Patent [19]

von der Ohe et al.

[11] 4,453,740
[45] Jun. 12, 1984

[54] AXLE CARRIER FOR MOTOR VEHICLES

[75] Inventors: Manfred von der Ohe, Stuttgart; Helmut Flemming, Hochdorf; Dirk Siebelt, Weinstadt; Werner König, Stuttgart; Otto Solleder, Leutenbach, all of Fed. Rep. of Germany

[73] Assignee: Daimler-Benz Aktiengesellschaft, Stuttgart, Fed. Rep. of Germany

[21] Appl. No.: 333,992

[22] Filed: Dec. 23, 1981

[30] Foreign Application Priority Data

Dec. 23, 1980 [DE] Fed. Rep. of Germany ....... 3048754

[51] Int. Cl.³ ............................................. B62D 21/00
[52] U.S. Cl. .................................... 280/781; 180/88; 180/312
[58] Field of Search .............. 280/781, 784, 785, 789, 280/791–800; 180/88, 312

[56] References Cited

U.S. PATENT DOCUMENTS

| 2,785,908 | 3/1957 | Werfel | 280/791 |
|---|---|---|---|
| 3,604,527 | 9/1971 | Price | 280/791 |
| 3,896,895 | 7/1975 | Schultz et al. | 180/88 |
| 4,016,947 | 4/1977 | Chamberlain | 180/88 |
| 4,106,807 | 8/1978 | Sakurai | 280/781 |
| 4,120,511 | 10/1978 | Allen et al. | 280/795 |
| 4,362,221 | 12/1982 | Manning | 180/88 |

FOREIGN PATENT DOCUMENTS 1093218 11/1960 Fed. Rep. of Germany .
806939 1/1959 United Kingdom .

Primary Examiner—Robert R. Song
Attorney, Agent, or Firm—Craig & Burns

[57] ABSTRACT

An axle carrier for motor vehicles having two side members extending in a longitudinal direction of the vehicle and two transverse members which connect the side members and are connected to the side members so that the corners at the point of connection are rigid or stiff with respect to moments about a longitudinal axis of the side members. These side members are constructed as hollow profiles which are resistant to torsion and to bending and, in a region of the respective ends thereof, are provided with openings for accommodating elastic supporting elements enabling the connecting of the axle carrier to a body of the vehicle. The axle carrier connection for the wheel guide members are provided only on the side members. The transverse members are formed by open profiles flexible to torsion, with respect to their longitudinal axis, and resistant to bending in a vertical direction transversely to the longitudinal axis.

21 Claims, 5 Drawing Figures

AXLE CARRIER FOR MOTOR VEHICLES

The present invention relates to an axle carrier for motor vehicles which is to be mounted onto a vehicle chassis including two side parts extending in a longitudinal direction of the vehicle and two transverse members for connecting the side parts, with the transverse members being connected to the side parts so that the corners are stiff or rigid with respect to moments about a longitudinal axis of the side part. The side parts are constructed as hollow profiles resistant to torsion and bending, with the hollow profiles being provided with means for accommodating elastic supporting elements by which the axle carrier may be supported relative to a body of the vehicle. Additionally, axle carrier connections are provided for wheel guide members, with the connections being assigned to the two side parts.

A known axle carrier is proposed in, for example, Reimpell, Fahrwerktechnik 1, 1970, page 116, wherein, as with other proposed axle carriers, the axle carrier is composed of torsionally stiff hollow profiles.

A disadvantage of having a rigid construction in aforementioned axle carrier is that during either a vertical or a horizontal excitation of the axle carrier along one side due to, for example, an unevenness in the road, the other side of the axle and any other parts supported on the axle carrier such as, for example, a rear axle housing or an engine, are also excited thereby resulting in the generation of undesirable vibrations. The generation of undesirable vibrations adversely influences handling characteristics of the motor vehicle.

The aim underlying the present invention essentially resides in providing an axle carrier of the aforementioned type for avoiding a mutual influencing of two axle halves of the vehicle and reducing undesirable vibration effects arising as a result of excitations acting on axle sides thereby improving the overall handling characteristics of the vehicle.

In accordance with advantageous features of the present invention, an axle carrier construction is provided wherein connections for wheel guide members are disposed or arranged only on side parts of the axle carrier, with transverse members of the carrier being formed by open profiles which are flexible in torsion with respect to their longitudinal axes and resistant to bending in a vertical direction transversely to their longitudinal axes.

Advantages obtained by the above-noted features of the present invention result in the fact that the axle carrier makes it possible for side parts of the carrier to shift relative to one another in a longitudinal direction under laterally introduced steering shocks acting on the guide members without any unit support on the transverse member or the other side part of the carrier being substantially influenced. Consequently, the mass to be moved in each case is less so that the longitudinal spring-suspension of the axle is much less complex.

The above-noted advantages also equally apply to vertical shocks on the wheel guide members, since the side parts of the axle carrier may be vertically deflected relative to one another. When such vertical deflections occur, the units supported conventionally in a longitudinal center region of the transverse members are substantially uninfluenced since, in the case of such vertical deflections, they are disposed in a region of a neutral zone.

In accordance with further features of the present invention, the transverse members are constructed to have greater resilience horizontally to their longitudinal axis than in a vertical direction. In accordance with still further features of the present invention, the transverse members, in a regional area in which they are connected to side parts of the axle carrier are fastened to the side parts along at least two sides of the respective side parts.

Additionally, in accordance with the present invention, end sections of the transverse members connected to the side parts are constructed as connecting means for connecting the axle carrier with wheel guide members.

Advantageously, in accordance with still further features of the present invention, at least one of the transverse members is formed as a U-shaped profile member having an upright web. Preferably, a length of the web is substantially greater than a length of legs of the U-shaped profile member.

In accordance with the present invention, at least one of the transverse members may be formed so as to have a substantially Z-shaped profile with an upright web.

It is also possible in accordance with the present invention, for the axle carrier to include a transverse member having a U-shaped profile and a transverse member having a Z-shaped profile.

According to the present invention, each of the transverse members is secured to a longitudinally extending side of the respective side parts and, in addition, one of the transverse members is secured or fastened to a topside of one of the side parts with the other transverse member being secured or fastened to a bottom side of the side part.

Accordingly, it is an object of the present invention to provide an axle carrier for a motor vehicle which avoids, by simple means, shortcomings and disadvantages encountered in the prior art.

Another object of the present invention resides in providing an axle carrier for motor vehicles which increases the driving comfort of the motor vehicle by improving vibration damping.

Yet another object of the present invention resides in providing an axle carrier for motor vehicles which provides a greater design freedom with respect to choosing a position of articulation points for wheel guide members of the vehicle.

A still further object of the present invention resides in providing an axle carrier for a motor vehicle which simplifies an assembly of the axle.

Yet another object of the present invention resides in providing an axle carrier for motor vehicles which is simple in construction and relatively light weight.

These and other objects, features, and advantages of the present invention will become more apparent from the following description when taken in connection with the accompanying drawing which shows, for the purpose of illustration only, one embodiment of an axle carrier constructed in accordance with the present invention, and wherein.

Figure 1:
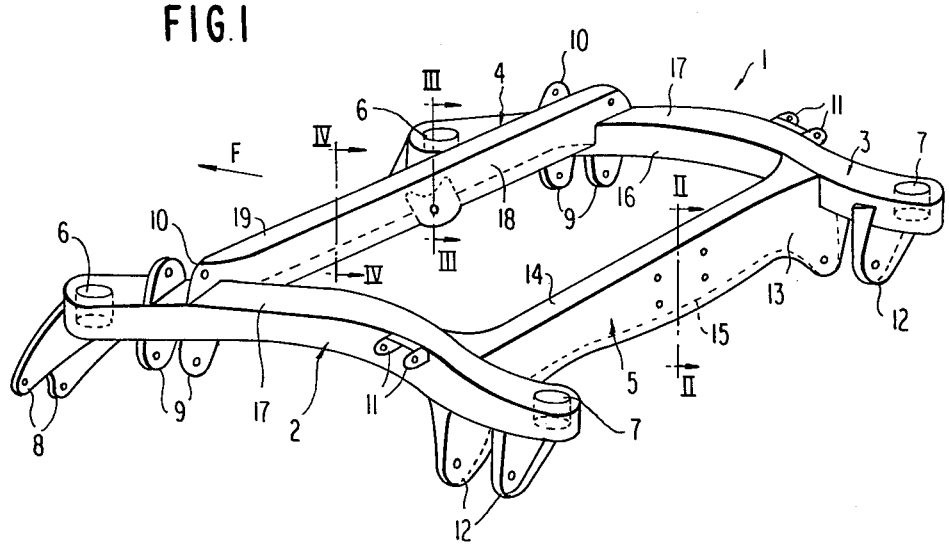
FIG. 1 is a partially schematic perspective view of a motor vehicle rear axle carrier constructed in accordance with the present invention.

Referring now to the drawings wherein like reference numerals are used throughout the several views to designate like parts and, more particularly, to FIG. 1, according to the Figure, an axle carrier generally designated by reference numeral 1 includes two side members or parts generally designated by the reference numerals 2,3 and two transversely extending members generally designated by the reference numerals 4,5, connecting the two side members 2,3. Side members or parts 2,3 are disposed at opposite sides of a motor vehicle (not shown) and extend essentially along the lateral sides of the vehicle, with the transverse members 4,5 extending in a direction transversely of the vehicle.

The side members or parts 2,3 are self-contained hollow profile members and may, for example, be constructed as disclosed in, for example, U.S. patent application Ser. No. 333,979, filed Dec. 23, 1981, wherein the hollow profile member is formed from two stamped or pressed generally shell-shaped sheet metal members joined together by, for example, welding. Openings 6, 7 are provided in end areas of each of the side members or parts 2,3. The openings 6,7 accommodate the elastic supporting element of a conventional construction (not shown), by which the axle carrier 1 is mounted onto the vehicle chassis of the vehicle. In the illustrated embodiment, the openings 6,7 are disposed substantially one behind the other, as viewed in a longitudinal direction of the vehicle.

Connection means for enabling a connection of wheel guide members (not shown) are all associated with the respective side parts or members 2,3. In the illustrated embodiment, the axle carrier 1 is provided for wheel guides formed by five single link struts, with five connections 8,9,10,11 and 12, being provided on each of the side parts or members 2,3. Each of the connections 8–12 include two shackles which are secured, for example, by welding, to the side parts or members 2,3. The wheel guide members are joined to the respective connections 8–12 and are secured, in a conventional manner, for example by elastic bearings (not shown).

As shown in FIG. 1, the connections 8, 9 and 10 or 11 and 12 respectively are associated with end regions of the side members or parts 2,3 so that a favorable load condition is provided for the side members or parts 2,3.

Of the transverse members 4, 5, the rearward transverse member 5, as viewed in a normal driving direction F of the vehicle, has an open U-shaped profile which includes an upright web 13 connected to two horizontally extending legs 14,15. The legs 14,15 project or extend forwardly in the driving direction F of the vehicle.

The transverse member 5 is connected to the respective side members or parts 2,3 along facing longitudinal sides, for example, the longitudinal side 16 of the side member or parts 3, as well as along undersides of the respective side members or parts 2,3. Advantageously, a position is selected for the transverse member 5 so that, in a region in which the transverse member 5 engages the side members or parts 2,3, the transverse member may also form one of the shackles of the connection 12. In this area, extending from the side part 2,3, the U-shaped basic cross-sectional form of the transverse member 5 is provided, for this purpose, with a downwardly extending projection.

The transverse member 4 is disposed forwardly of the transverse member 5, as viewed in a normal driving direction F of the vehicle. In contrast to the transverse member 5, the transverse member 4 engages over the side members or parts 2,3 and on a topside of the respective members so that a connection between the transverse member 4 and the side parts or members 2,3 is obtained along longitudinal sides facing one another, i.e., longitudinal side 16 of the side member or part 3, and topsides 17.

The transverse members 4,5 are each secured by, for example, welding, to the respective longitudinal sides 16 and topsides 17 of the side members or parts 2,3. Therefore, the side members or parts 2,3 are connected to the transverse members 4,5 so that the corners of the axle carrier 1 are stiff or rigid with respect to moments about the longitudinal axes of the side members or parts 2,3, which extend in the longitudinal direction of the vehicle.

The transverse member 4 is also arranged to form a shackle of the connection 10 of an area wherein the transverse member 4 respectively engages over the side part 2,3. Although the shackle is formed by a tapering end of the transverse member 4, the shackle must be considered as being respectively associated with the side members or parts 2,3 such that there is an absolutely rigid connection so that there is no other influence on the respective transverse members 4,5 caused by the end of the transverse member 4 by virtue of the end serving, at the same time, as a shackle of the connection 10.

Figure 4:
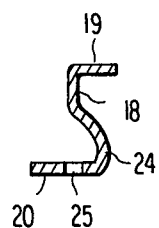
FIG. 4 is a cross-sectional view taken along the line IV—IV in FIG. 1.
Figure 3:
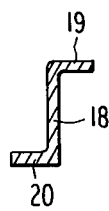
FIG. 3 is a cross-sectional view taken along the line III—III in FIG. 1.
Figure 2:
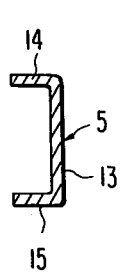
FIG. 2 is a cross-sectional view taken along the line II—II in FIG. 1.

As shown in FIGS. 3 and 4, the transverse member 4 has a basic Z-shaped cross-sectional configuration and is provided with an upright web 18 interposed between and connecting to horizontally extending legs 19,20. The leg 19 extends rearwardly, and the leg 20 extends forwardly, as viewed in a normal driving direction F of a vehicle. As with the U-shaped profile for the transverse member 5, the Z-shaped profile of the transverse member 4 is resistant to a bending in a vertical direction; however, the transverse member 4 is flexible in torsion with respect to a longitudinal axis of the transverse member 4. Additionally, a bending resistance of the transverse member 4 is also larger in a vertical direction, that is, the bending resistance is greater with respect to vertical forces than with respect to horizontal forces. Consequently, as a result of the profile thereof, a load bearing capacity of the transverse member 4 is especially favorable with respect to vertical forces since there is a connection to the side parts or members 2,3. This connection ensures that the corners are rigid or stiff with respect to this type of stressing, since the webs 13 and 18 are welded to the two sides of the side members or parts 2,3 as described hereinabove.

Figure 5:
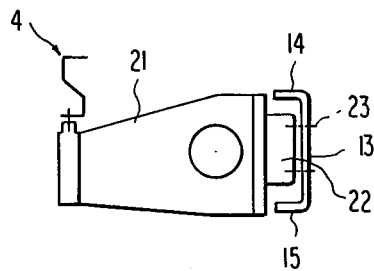
FIG. 5 is a schematic representation of an articulation of a rear axle gear arrangement to transverse members of the axle carrier constructed in accordance with the present invention.

As shown in FIG. 5, when the axle carrier 1 is employed as a web axle carrier, an especially favorable manner of attachment for a rear axle housing 21 is afforded since such attachment can be provided on a rear side. For example, an elastic bearing projection 22 which is adapted to extend inwardly between legs 14,15 of the transverse member 5, with the bearing projection 22 being directly secured to the web 13 of the transverse member 5 by suitable fasteners such as, for example, screws or bolts 23.

A front end of the rear axle housing 21 may be fastened, from an underside thereof, against the transverse member 4. For this purpose, as shown in FIG. 4, a bulge is provided in a lower portion of a web 18 of the transverse member 4, which extends in a rearward direction, as viewed in the driving direction F, with the bulge leading to a corresponding widening of the leg 20. By virtue of this arrangement, it is possible to provide a fastening hole or opening 25 which is located essentially in a plane of the web 18. Therefore, the transverse member 4 is not twisted by the forces introduced by the axle housing 21.

By virtue of providing transverse members 4,5 having the above-noted profiles, which, are merely exemplary, the transverse members 4,5 are highly resistant to bending with respect to forces perpendicular to their longitudinal axes but, preferably, are somewhat more flexible in bending horizontally with respect to their longitudinal axis and flexible in torsion, especially about their longitudinal axis. Consequently, mutual vertical deflections of the side members or parts, 2,3, generally resistant to bending into torsion, are possible. Such vertical deflections do not substantially adversely influence or affect units essentially articulated to the transverse members 4,5. Even in a situation wherein there is a slight longitudinal offset of the side members or parts 2,3 relative to one another, no substantial adverse influence on the additional aggregates or units attached at the longitudinal center of the transverse members result. Consequently, a mutual influence on the wheel guides at respective sides of the two axles of the vehicle may be essentially prevented without any of the disadvantages which normally arise as a result of the supporting of the additional units or aggregates on the subframe or axle carrier. Instead, by virtue of the features of the present invention, it is, at the same time, guaranteed that as a result of the ability of the transverse members 4,5 to twist while simultaneously resisting bending in a vertical direction, vibration exciting effects and forces which are introduced either by way of the wheel guides or through the additional aggregates or units of the motor vehicle have no desirable consequential effects.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, and intend to cover all such modifications as are encompassed by the scope of the appended claims.

We claim:

1. An axle carrier for a motor vehicle, which is to be mounted onto a vehicle chassis having a pair of spaced side members extending in a longitudinal direction of the vehicle, and a further pair of spaced members extending transversely to the longitudinal direction of the vehicle for connecting the side members to each other, comprising means provided on the respective side members for connecting the axle carrier to wheel guide members of the motor vehicle, and each of the transverse members has a predetermined open profile such that the transverse members are flexible to torsion with respect to a longitudinal axis of the transverse members and resistant to bending in a vertical direction extending transversely to the longitudinal axis of the transverse member.

2. The axle carrier according to claim 1, wherein the transverse members are connected to each of the side members such that corners between the transverse members and the side members are rigid with respect to moments about a longitudinal axis of each of the side members, and the means for enabling the connecting of the axle carrier to the wheel guide members are disposed only on the respective side members.

3. The axle carrier according to claim 2, wherein each of the side mebers are hollow profile members constructed so as to be torsion and bending resistant, and means are provided at the respective end areas of the respective side members for enabling a mounting of the axle carrier onto the vehicle chassis.

4. The axle carrier according to one of claims 1, 2, or 3, wherein each of the transverse members has a horizontal resilience which is greater than its resilience in a vertical direction.

5. The axle carrier according to claim 4, wherein the transverse members are respectively connected to each of the side members along at least two outer surfaces of the side members.

6. The axle carrier according to claim 5, wherein each of the transverse members terminate in end sections connected to the respective side members, and at least a portion of the respective end sections form a part of the means for enabling a connection of the axle carrier to the wheel guide members.

7. The axle carrier according to claim 6, wherein at least one of the transverse members has a U-shaped profile opening in a normal driving direction of the motor vehicle.

8. The axle carrier according to claim 7, wherein the transverse member having the U-shaped profile includes a pair of leg portions interconnected by a web portion, and a length of the web portion is greater than a length of either of the leg portions.

9. The axle carrier according to claim 6, wherein at least one of the transverse members has a substantially Z-shaped profile, with a substantially vertically extending web portion.

10. The axle carrier according to claim 6, wherein one of the transverse members has a substantially U-shaped profile and the other transverse member has a substantially Z-shaped profile.

11. The axle carrier according to claim 10, wherein the transverse member having the substantially U-shaped profile is disposed toward a rear of the axle carrier, as viewed in a normal driving direction of the motor vehicle, and the U-shaped profile opens in a normal driving direction of the vehicle.

12. The axle carrier according to claim 10, wherein each of the side members includes a top outer surface, a bottom surface, and lateral surfaces facing each other, and one of the transverse members is connected to the lateral surfaces and bottom surface of the respective side members, and the other transverse member is connected to the lateral surfaces and top surfaces of the respective side members.

13. The axle carrier according to claim 12, wherein the transverse member connected to the lateral surfaces and bottom surface of the respective side members is disposed at a rear of the axle carrier, as viewed in a normal driving direction of the vehicle.

14. The axle carrier according to one of claims 1, 2, or 3, wherein the transverse members are respectively connected to each of the side members along at least two outer surfaces of the side members.

15. The axle carrier according to claim 14, wherein each of the side members includes a top outer surface, a bottom surface, and lateral surfaces facing each other, and one of the transverse members is connected to the lateral surfaces and bottom surface of the respective side members, and the other transverse member is connected to the lateral surfaces and top surfaces of the respective side members.

16. The axle carrier according to one of claims 1, 2, or 3, wherein each of the transverse members terminate in end sections connected to the respective side members, and at least a portion of the respective end sections form a part o the means for enabling a connection of the axle carrier to the wheel guide members.

17. The axle carrier according to one of claims 1, 2, or 3, wherein at least one of the transverse members has a U-shaped profile opening in a normal driving direction of the motor vehicle.

18. The axle carrier according to claim 17, wherein the transverse member having the U-shaped profile includes a pair of leg portions interconnected by a web portion, and a length of the web portion is greater than a length of either of the leg portions.

19. The axle carrier according to one of claims 1, 2, or 3, characterized in that at least one of the transverse members has a substantially Z-shaped profile, with a substantially vertically extending web portion.

20. The axle carrier according to one of claims 1, 2, or 3, wherein each of the side members includes a top outer surface, a bottom surface, and lateral surfaces facing each other, and one of the transverse members is connected to the lateral surfaces and bottom surface of the respective side members, and the other transverse member is connected to the lateral surfaces and top surfaces of the respective side members.

21. The axle carrier according to claim 20, wherein the transverse member having the substantially U-shaped profile is disposed toward a rear ofthe axle carrier, as viewed in a normal driving direction of the motor vehicle, and the U-shaped profile opens in a normal driving direction of the vehicle.

* * * * *